United States Patent [19]

Seko et al.

[11] Patent Number: 5,196,970
[45] Date of Patent: Mar. 23, 1993

[54] MAGNETIC DISC APPARATUS

[75] Inventors: Satoru Seko; Yoshiyuki Kunito; Takayasu Muto; Tomoki Kawabata, all of Kanagawa, Japan

[73] Assignee: Sony Corporation, Tokyo, Japan

[21] Appl. No.: 427,260

[22] Filed: Oct. 25, 1989

[30] Foreign Application Priority Data

| Oct. 26, 1988 | [JP] | Japan | 63-270366 |
| Oct. 31, 1988 | [JP] | Japan | 63-275325 |
| Nov. 29, 1988 | [JP] | Japan | 63-301768 |

[51] Int. Cl.$^5$ ............................................. G11B 5/596
[52] U.S. Cl. ............................ 360/77.03; 360/65; 360/77.04; 360/77.07; 360/135
[58] Field of Search .............. 360/77.02, 77.03, 77.04, 360/77.07, 65, 49, 135, 51

[56] References Cited

U.S. PATENT DOCUMENTS

| 3,084,337 | 4/1963 | Willard | 360/65 X |
| 3,430,215 | 2/1969 | Krossa et al. | 360/65 X |
| 3,775,655 | 11/1973 | DuVall | 318/634 |
| 4,016,603 | 4/1977 | Ottesen | 360/135 |
| 4,136,365 | 1/1979 | Chick et al. | 360/77.04 X |
| 4,396,959 | 8/1983 | Harrison et al. | 360/77.03 X |
| 4,516,177 | 5/1985 | Moon et al. | 360/77.03 X |
| 4,524,397 | 6/1985 | Chalmers et al. | 360/77.03 |
| 4,564,869 | 1/1986 | Baumeister | 360/65 X |
| 4,625,109 | 11/1986 | Nixon | 250/231.14 |
| 4,714,967 | 12/1987 | Bizjak | 360/49 X |
| 4,782,404 | 11/1988 | Baba | 360/77.07 |
| 4,786,990 | 11/1988 | Overton et al. | 360/65 |
| 4,814,909 | 3/1989 | Brown et al. | 360/77.07 |
| 4,825,313 | 4/1989 | Moribe et al. | 360/77.02 |
| 4,918,677 | 4/1990 | Ashinuma et al. | 360/51 X |
| 4,974,109 | 11/1990 | Hoshimi et al. | 360/77.03 X |

OTHER PUBLICATIONS

A. Paton, Correction of Data Track Misregistration in Servo Controlled Disk Files, IBM Technical Disclosure Bulletin, vol. 17, No. 6, Nov. 1974, pp. 1781–1783.

Primary Examiner—Joseph L. Dixon
Assistant Examiner—David L. Robertson
Attorney, Agent, or Firm—Philip M. Shaw, Jr.

[57] ABSTRACT

A magnetic disc apparatus having at least one magnetic disc having a plurality of track groups thereon at different distances from the center of the disc each of which groups comprises plural data tracks having plural data sectors, each of the track groups having a different number of the data sectors therein in such a manner that the outer track group has more data sectors, a transducer head for reading and writing data signals from and on the data tracks, an actuator for positioning the transducer head over a desired one of the data tracks, a position sensor for sensing the position of the transducer head relative to the magnetic disc, and for generating at least two periodic position signals each of which is out of phase with each other, and a controller for controlling the actuator according to the periodic position signals so that the transducer head is positioned over the desired one of the data tracks.

9 Claims, 10 Drawing Sheets

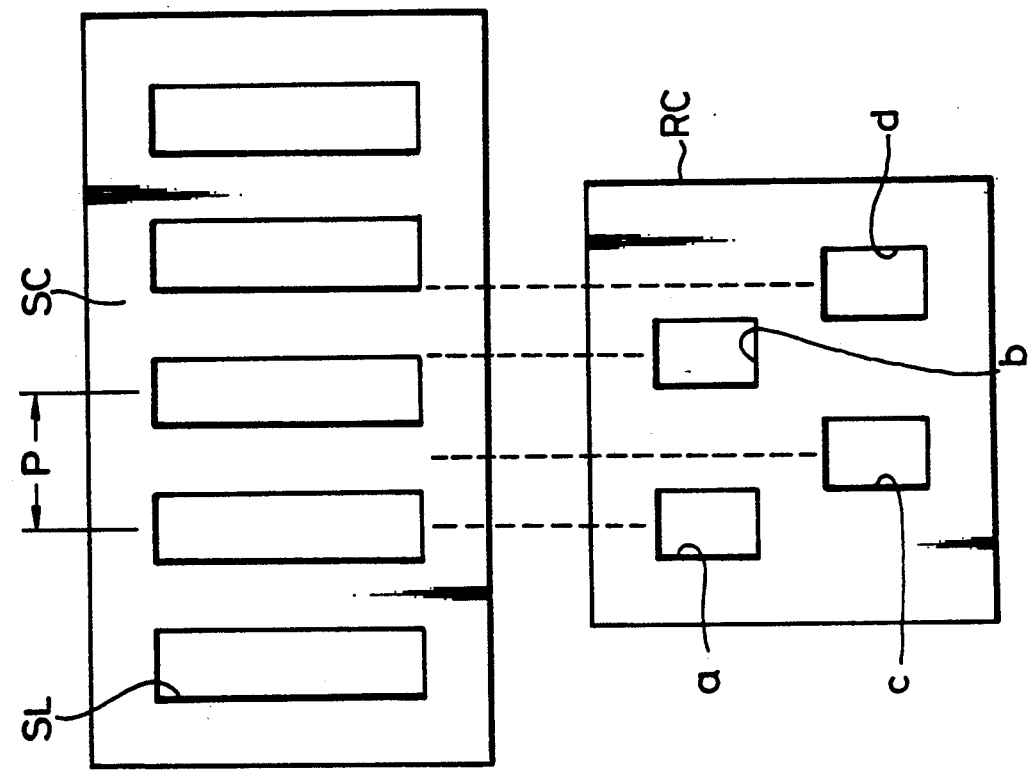
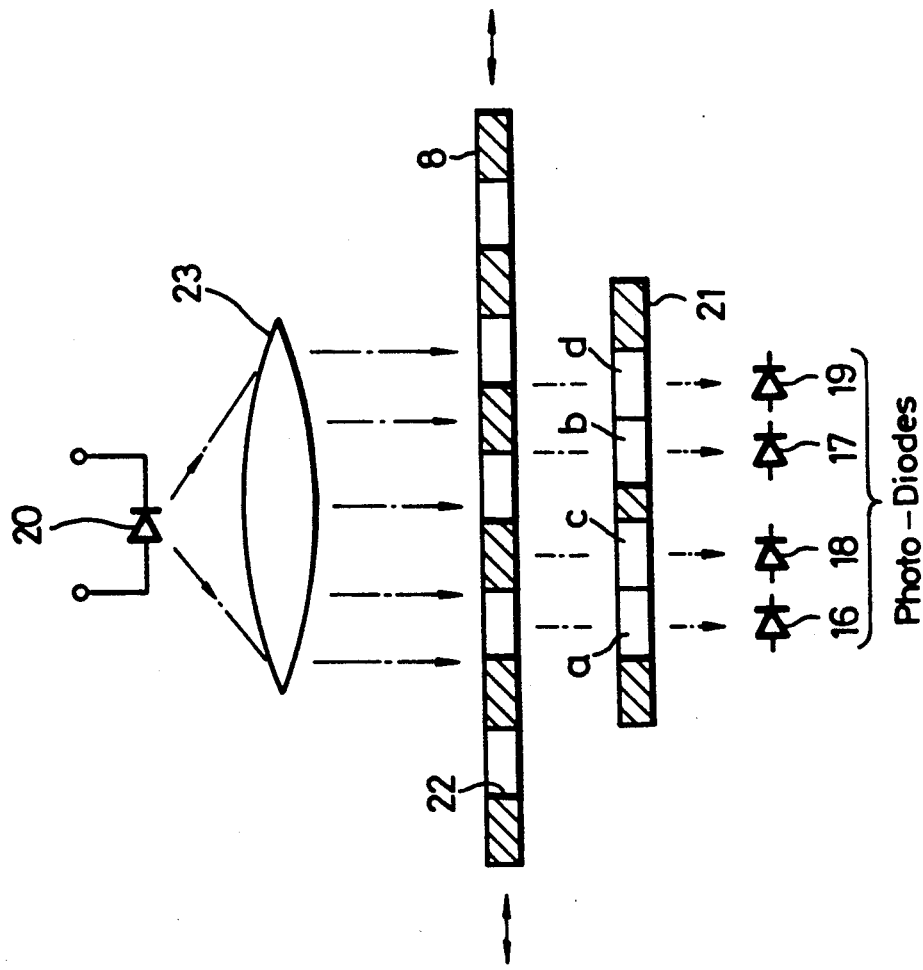

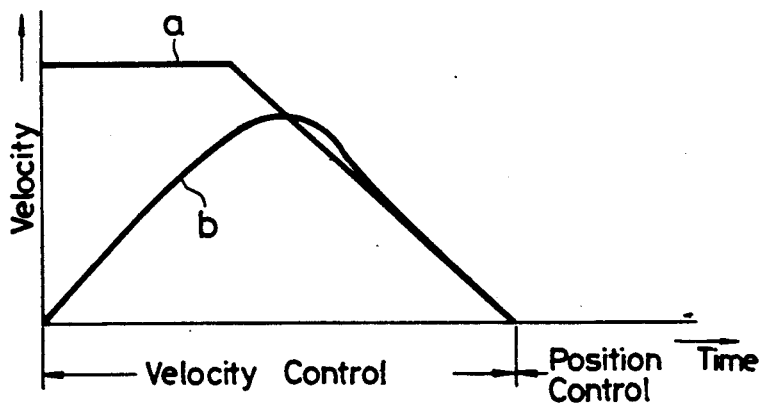
FIG. 6A
FIG. 6B
FIG. 7D
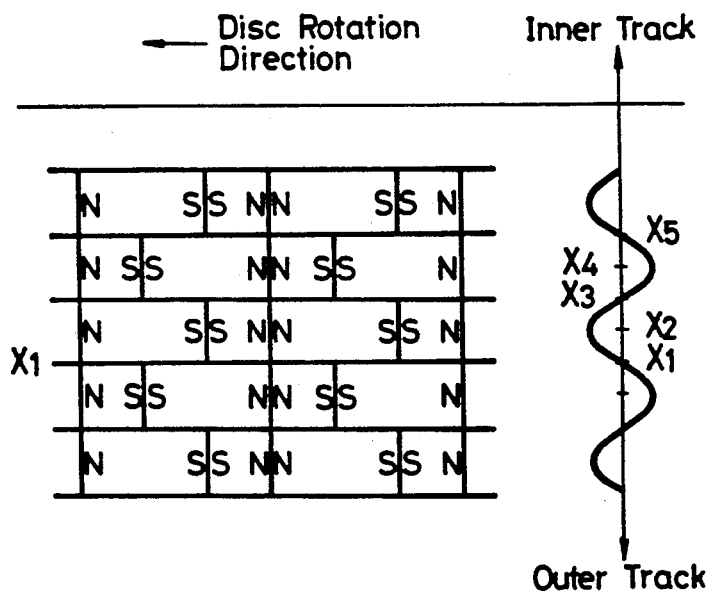
FIG. 7A
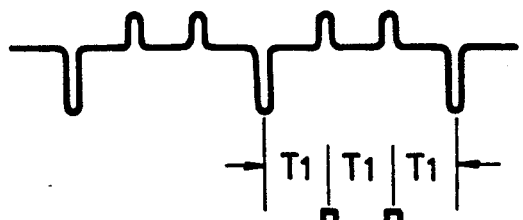
FIG. 7B
FIG. 7C

MAGNETIC DISC APPARATUS

BACKGROUND OF THE INVENTION

1. Field of the Invention

The present invention relates generally to a hard disc drive apparatus for driving a hard disc or the like which is employed as an external storage apparatus for a computer and, more particularly, is directed to a tracking servo system, by which a transducer head for reading and writing data is properly positioned on a data track of the hard disc.

2. Description of the Prior Art

A hard disc drive apparatus is employed for driving a hard disc or the like as an external storage apparatus of a computer. According to such a hard disc drive apparatus, data is recorded on concentric tracks formed on the hard disc. Also, sectors of a predetermined number are provided on each track, and data is recorded on and reproduced from each sector. Accordingly, when data is recorded on and reproduced from the tracks of the hard disc, the seeking operation is performed with respect to a track designated a computer, and the data is recorded on and reproduced from the designated sector of the tracks.

FIG. 1 shows a typical recording format of a hard disc 1 according to the prior art. As shown in FIG. 1, the number of data sectors in each track is selected to be constant from the innermost track to the outermost track as shown in FIG. 1. Further, the positions of the boundaries between adjacent data sections are arranged in radial directions. Therefore, it is proposed to provide a servo sector between radially provided data sectors, in which there is sequentially and repeatedly provided servo address data of, for example, 4 bits (00 to 15) in order to perform the track seeking operation. According to this proposal of the sector servo system disc apparatus in which servo address data are repeatedly recorded at every predetermined number of tracks, the upper limit of the head moving speed must be determined in the seeking operation. In the above-mentioned example according to the prior art, the upper limit of the head moving speed is determined such that the head should not cross more than 8 tracks during a period in which the disc 1 is rotated by one sector amount. Thus, a desired track can be detected on the basis of servo address data read intermittently and the position in which the head is positioned.

In the above-mentioned hard disc drive apparatus, however, the lengths of the innermost and outermost peripheral tracks are different by about a factor of two. If the number of sectors in the innermost and outermost peripheral tracks are determined to be constant so that the storage capacity may become constant, then the recording density of the outermost peripheral track will be lowered.

To overcome the above-mentioned defects, a so-called zone recording system is proposed, in which a record surface of the disc is divided dependent on radius positions of the tracks to provide a plurality of zones, and at every zone the number of the data sectors provided in the respective tracks are made different in such a manner that outer zone has more data sectors. According to this proposal, the storage capacity of the whole disc can be increased by substantially twice. However, when the zone recording system is performed in practice, the border positions of the data sectors become irregular in every zone so that a track seeking operation utilizing the servo address data can not be made.

Further, another proposal is known, in which when a plurality of discs are stacked upon use, one surface of a desired disc is employed as a surface in which a servo signal is exclusively recorded, and the track seeking operation is performed by using the servo signal reproduced from this servo signal surface. According to this proposal, one surface of the disc becomes useless for recording and reproducing data, thereby preventing an increase of the storage capacity according to the zone recording system.

OBJECTS AND SUMMARY OF THE INVENTION

Accordingly, it is an object of the present invention to provide an improved magnetic disc apparatus which can eliminate the defects encountered with the prior art;

More specifically, it is an object of the present invention to provide a magnetic disc apparatus in which gains and offset amounts of a plurality of detecting circuits supplied with detected outputs from a plurality of photo-detectors can be readily adjusted with ease.

It is another object of the present invention to provide a magnetic disc apparatus in which adjusted states of the gains and offset amounts of a plurality of detecting circuits can be reproduced with ease.

According to an aspect of the present invention, there is provided a magnetic disc apparatus comprising:

(a) at least one magnetic disc having a plurality of track groups thereon at different distances from the center of the disc each of which groups comprises plural data tracks having plural data sectors, each of the track groups having a different number of the data sectors therein in such a manner that outer track group has more data sectors;

(b) transducer means for reading and writing data signals from and on the data tracks (c) actuator means for positioning the transducer means over a desired one of the data tracks;

(d) position sensor means for sensing the position of the transducer means relative to the magnetic disc, and for generating at least two periodic signals each of which is out of phase with each other; and (e) controller means for controlling the actuator means according to the periodic position signals so that the transducer means is positioned over the desired one of the data tracks.

According to other aspect of the present invention, there is provided a magnetic disc apparatus comprising:

(1) at least one magnetic disc having a plurality of track groups thereon at different distances from the center of the disc each of which groups comprises plural data tracks having plural data sectors, each of said track groups having a different number of the data sectors therein in such a manner that outer track groups has more data sectors, and said servo signals being provided in servo sectors located between the data sectors;

(2) transducer means for reading and writing data signals from and on the data sectors, and for reading the servo signals from the servo sectors;

(3) servo signal processing means for processing the servo signals read from the servo sectors into a tracking error signal, wherein said servo signal processing means has a plurality of filter means for filtering the tracking error signal, one of the plural filter means being selected corresponding to the track group from which the servo signal is read and being supplied with the tracking error signal; and (4) controller means for controlling the actuator means according to the tracking error signal from the filter means so that the transducer means is positioned over the desired one of the data tracks.

According to a further aspect of the present invention, there is provided a magnetic disc apparatus comprising:

(A) a magnetic disc having a plurality of concentric data tracks;

(B) transducer means for reading and writing data signals on the data tracks;

(C) actuator means for positioning said transducer means over a desired one of the data tracks;

(D) detector means for detecting an external force biased on the actuator means;

(E) memory means for storing the detected external force corresponding to the position of the actuator means; and (F) controller means for controlling the actuator means according to the data read from the memory means as a compensation signal.

The above, and other objects, features and advantages of the present invention, will be apparent in the following detailed description of preferred embodiments when read in conjunction with the accompanying drawings in which the same reference numerals are used to identify the same or similar parts in the several views.

BRIEF DESCRIPTION OF THE DRAWINGS

FIGS. 3A and 3B are schematic views of a position sensor and a fragmentary enlarged planar view thereof, and to which reference will be made in explaining a photo-encoder used in the hard disc drive apparatus of the present invention;

FIGS. 6A and 6B are schematic diagrams used to explain a head positioning sequence of the hard disc drive apparatus of the present invention;

FIGS. 7A–7D are schematic views to which reference will be made in explaining a servo signal used in the hard disc drive apparatus of the present invention;

DETAILED DESCRIPTION OF PREFERRED EMBODIMENTS

The present invention will now be explained with reference to the drawings.

Figure 1:
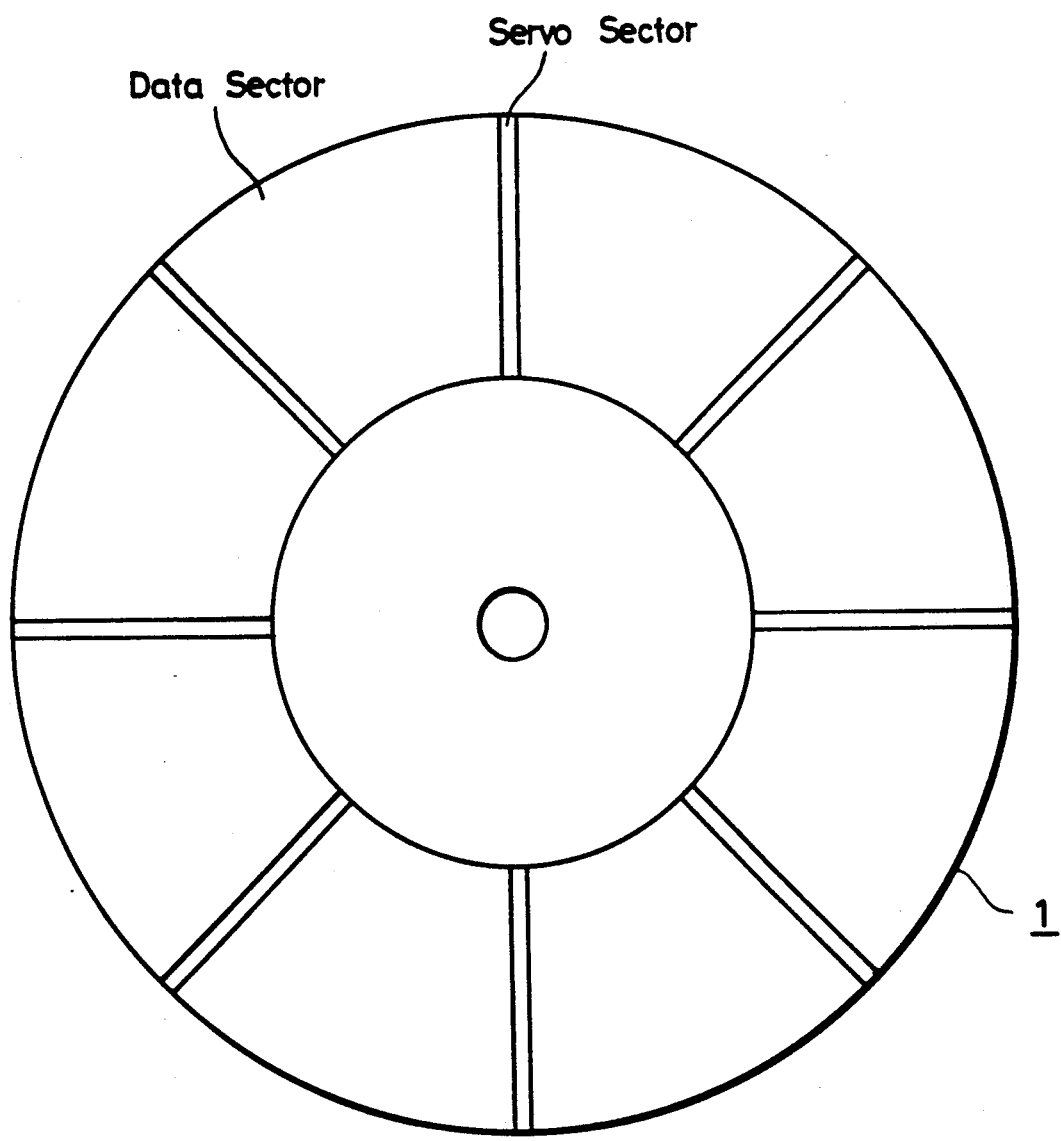
FIG. 1 is a schematic representation of a pattern of data recorded on a hard disc by a hard disc drive apparatus according to the prior art.
Figure 2:
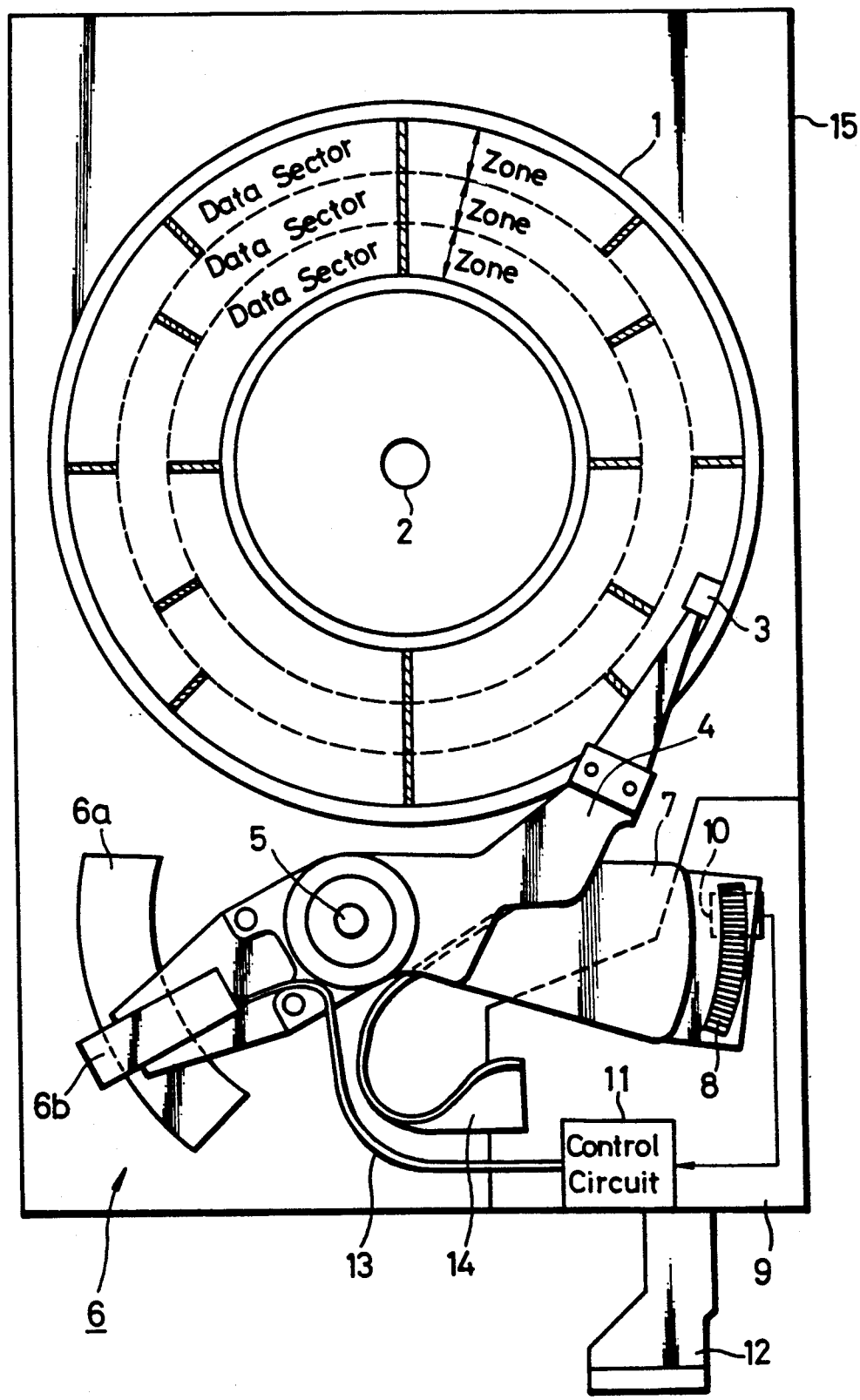
FIG. 2 is a planar view of a hard disc drive apparatus according to an embodiment of the present invention.
Figure 4A:
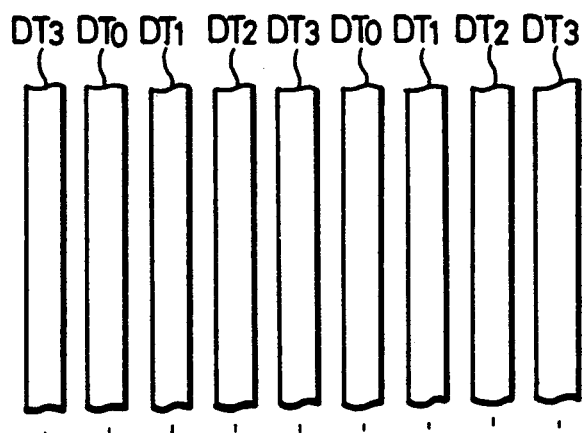
FIGS. 4A to 4E are schematic views used to explain a relationship between an output of the photo-encoder and data tracks, and to which reference will be made in explaining the operation of the hard disc drive apparatus of the present invention.
Figure 4B:
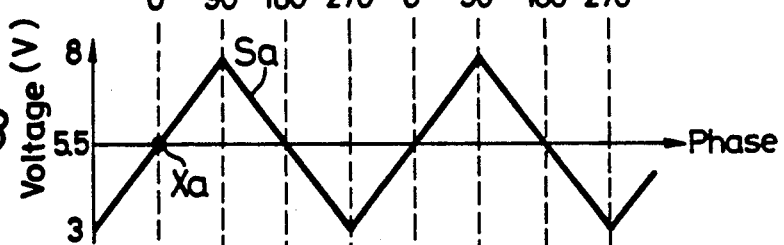
Figure 4C:
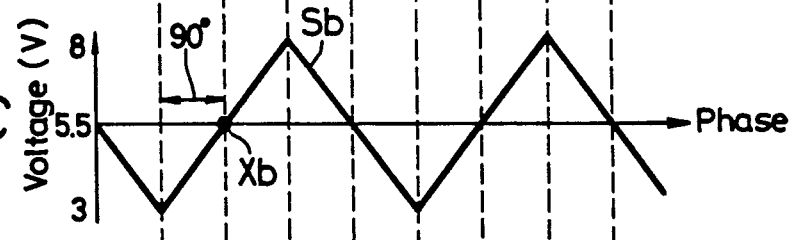
Figure 4D:
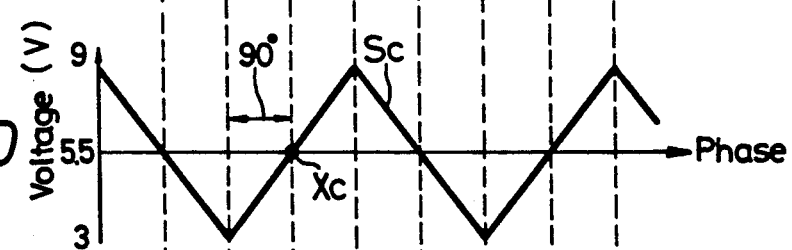
Figure 4E:
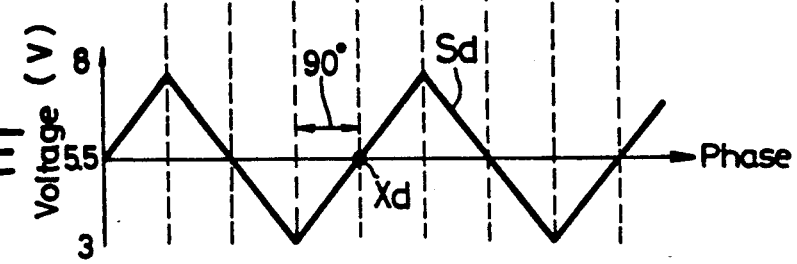

FIG. 2 is a planar view of a general or overall arrangement of a tracking servo system according to an embodiment of the present invention.

In FIG. 2, it will be seen that a record surface of a hard disc 1 is divided into a plurality of zones dependent on the radius positions of the tracks. The number of sectors formed on the respective tracks at every zone is increased on the outer record surface while it is decreased on the inner record surface. To gain a better understanding of the present invention, the record surface of the hard disc 1 is divided to provide three zones, namely, the outer zone, intermediate zone and inner zone, and 8, 6 and 4 sectors are provided on these zones, in that order, Therefore, assuming that the number of tracks in each zone is, for example, 500, then the number of all data sectors will be expressed as $$500 \times (8+6+4) = 9000$$

Thus, 9000 data sectors are provided, and as compared with the number of all data sectors when 4 sectors are assumed to all tracks in order to radially arrange the positions of sectors ($1500 \times 4 = 6000$), an increase in data capacity of 1.5 times can be provided.

The hard disc 1 is rotated at high speed by a spindle 2 and a head 3 is opposed to the record surface of the hard disc 1. The head 3 is mounted to one end of a head arm 4, and the head arm 4 is pivotally supported at an intermediate portion thereof by a rotary shaft 5 and another end of the head arm 4 is driven by a voice coil motor 6 so that the head 3 is moved to a desired position of the hard disc 1 along its radius direction. The voice coil motor 6 is comprised of a stator portion 6a such as a permanent magnet, a yoke and so on fixed to a chassis 15 and a drive coil 6b mounted on another end of the head arm 4.

A second arm 7 is provided to be driven as one body with the head arm 4, and a scale 8 is attached to another end of the arm 7 to detect the position. A circuit base plate 9 is fixed to the chassis 15 or the like, and a photosensor 10 is mounted on the base plate 9 so as to oppose the scale 8. The photosensor 10 and the scale 8 form a cycle signal in accordance with the movement of the head arm 4. This cycle signal will be explained more fully later.

A signal from the photosensor 10 is supplied to a control circuit 11 on the base plate 9. The control circuit 11 on the base plate 9 is also supplied with a signal indicative of a target position from an external host computer (not shown) or the like through an input and output cable 12. A control signal from the control circuit 11 is supplied to the drive coil 6b through a flexible cable 13.

A signal reproduced from the hard disc 1 by the head 3 is supplied to the circuit base plate 9 through a flexible cable 14. Further, the external host computer or the like is connected to the head 3 via the input and output cable 12, the circuit base plate 9 and the flexible cable 14, whereby a signal from the host computer or the like is recorded on and/or reproduced from the hard disc 1.

FIG. 3 shows an arrangement of the photosensor 10 and so on.

As shown in FIG. 3, the photosensor 10 is comprised of a light emitting diode 20, four photo-diodes 16 to 19 for detecting light, a reticle 21 having optical transmissivity portions a to d corresponding to the four photo-diodes 16 to 19, the scale 8 located between the light emitting diode 20 and the reticle 21 and having a plurality of slits or light transmissivity portions 22 arranged with a predetermined pitch and a convex lens 23 which collimates a diverged light from the light emitting diode 20 to a collimated light beam, and which causes the collimated light beam to become incident on the scale 8.

In this case, when the head arm 4 is rotated, the scale 8 fixed to the second arm 7 is moved in the direction along which the optical transmissivity portions, i.e. slits 22 of the scale 8 are arranged. The slits 22 are formed at the predetermined pitch, and the widths of the slits 22 and the widths of the light-pass-inhibiting portions formed between the slits 22 are selected to be equal to each other. The widths of the optical transmissivity portions a to d of the reticle 21 are the same as those of the slits 22 of the scale 8, and are each located with a positional displacement of $(\frac{1}{4})$ P+nP if the pitch of the slit 22 in the scale 8 is taken as P. In the foregoing, n is any one of 0, 1, 2, 3, . . . and in this embodiment, 0 and 1 are employed.

Detected outputs from the photo-diodes 16 to 19 corresponding to the optical transmissivity portions a to d of the reticle 21 are supplied to detecting circuits as will be described later, respectively.

The detecting circuits generate 4-phase detected outputs Sa to Sd of triangular waveforms, each having a phase difference of 90 degrees as shown in FIGS. 4B to 4E.

Points Xa to Xd at which the positive slant portions of these 4-phase triangular-shaped position detecting outputs Sa to Sd cross a reference voltage, for example, a line of 5.5 V are made corresponding to adjacent tracks of the hard disc or magnetic disc 1, for example, data tracks $DT_0$, $DT_1$, $DT_2$ and $DT_3$ each having an equal pitch, in that order. Thus, when the head 3 is moved, the moving speed of the head 3 can be detected by detecting the frequencies of these signals. Also, it is possible to detect the track cross-point of the head 3 by detecting the points at which these signals and the above-noted reference voltage 5.5 V cross one another.

Figure 5A:
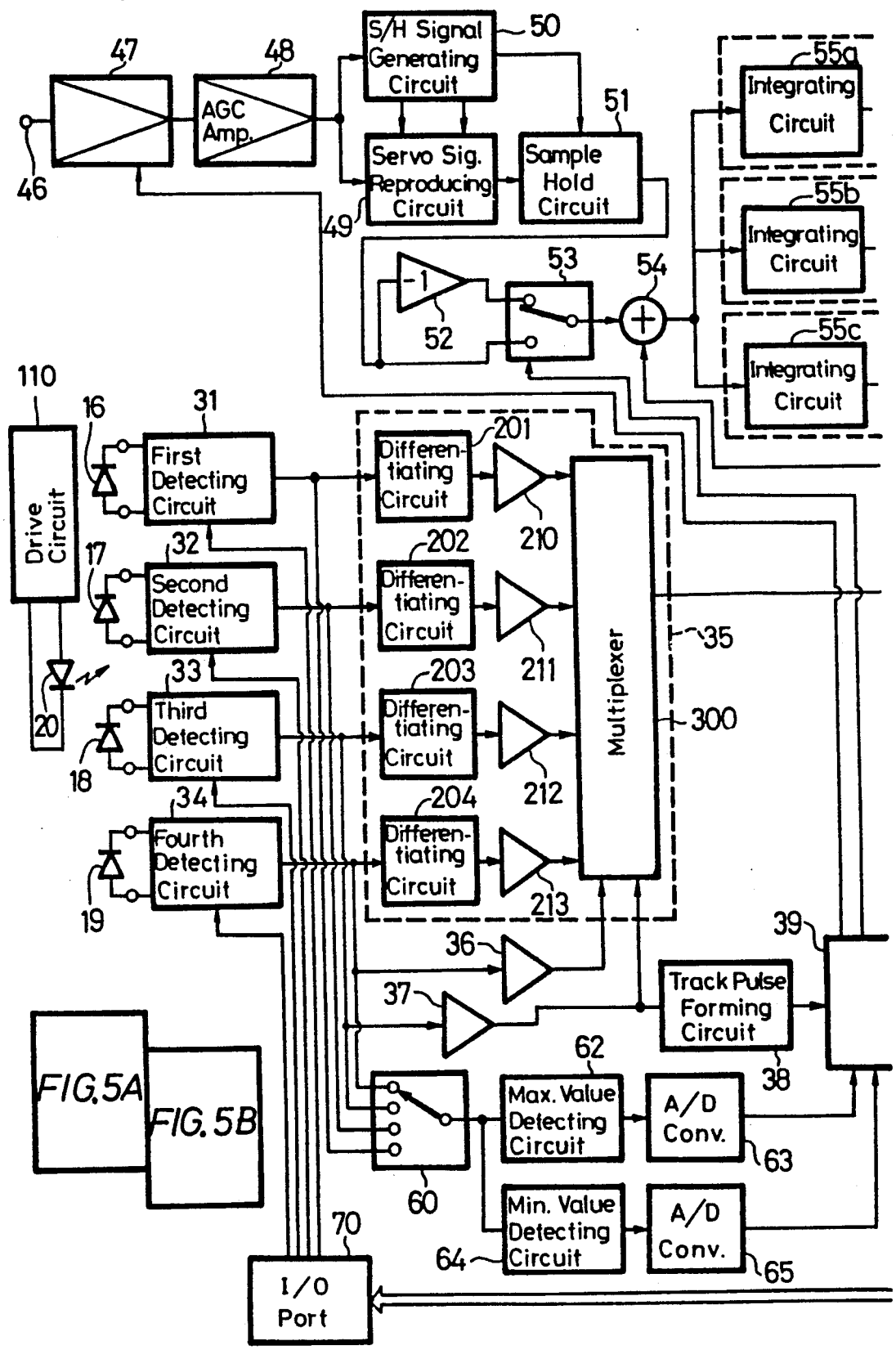
FIG. 5 (formed of FIGS. 5A and 5B) is a block diagram of a tracking servo circuit used in the hard disc drive apparatus of the present invention.
Figure 5B:
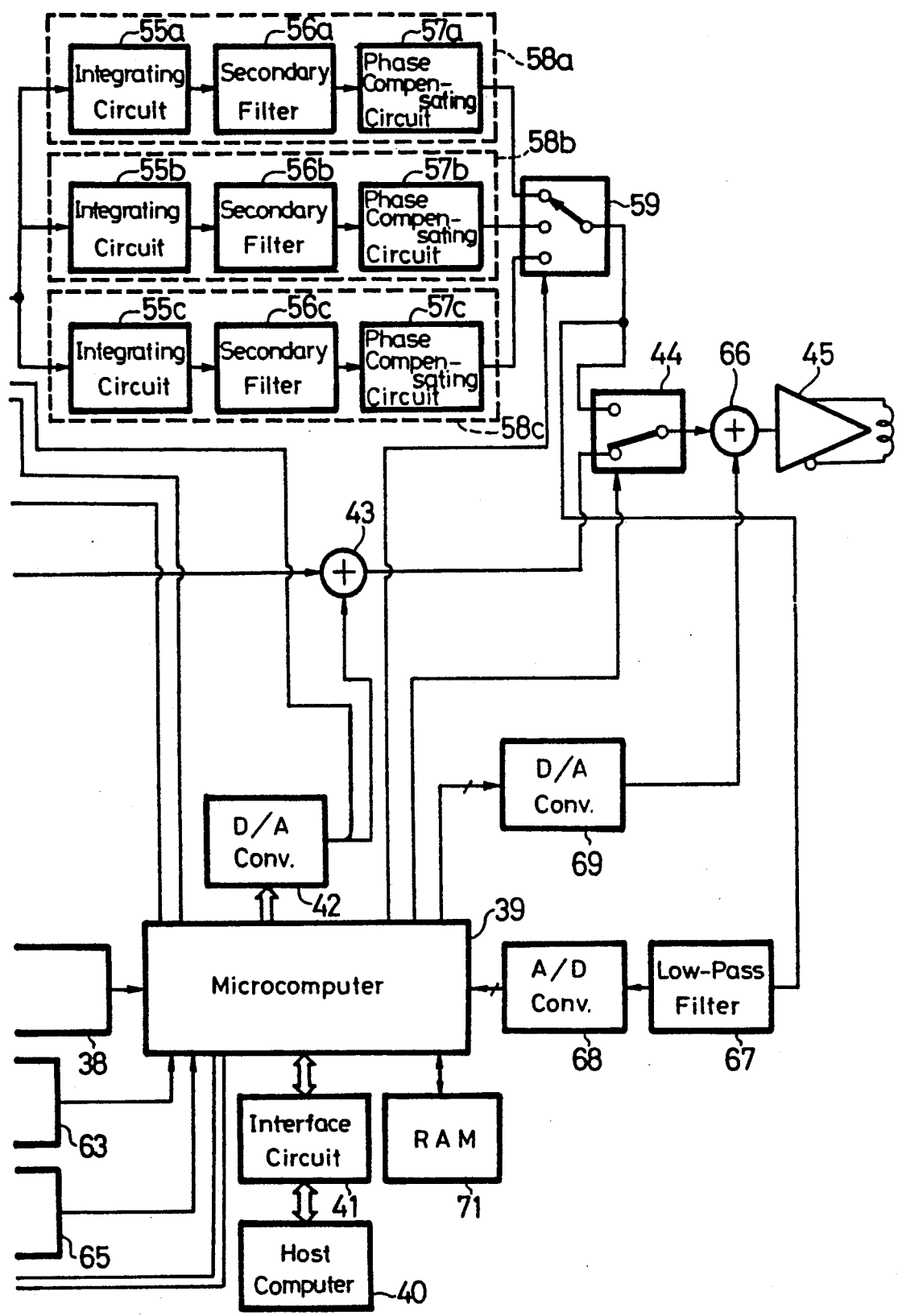

FIG. 5 (formed of FIGS. 5A and 5B to permit the use of a suitably large scale) is a block diagram showing an example of the control circuit 11 provided on the circuit base plate 9.

Referring to FIG. 5, signals A, B, C and D from the photo-diodes 16 to 19 of the photosensor 10 are respectively supplied to first to fourth detecting circuits 31 to 34, and signals from the detecting circuits 31 to 34 are supplied to a frequency-to-voltage converting circuit 35 which is comprised of differentiating circuits 201 to 204, amplifiers 210 to 214, a multiplexer 300 and so on. The signals from the detecting circuits 33 and 34 are waveform-shaped by comparators 36 and 37 and are fed to the multiplexer 300 in the frequency-to-voltage converting circuit 35. The signal from the comparator 37 is also supplied to a track pulse forming circuit 38 which detects the intersection of the above-noted center level to form a track pulse indicating a track intersection by the head 3.

The track pulse from the track pulse forming circuit 38 is supplied to a microcomputer 39 in which the track position with which the head 3 is in contact can be measured by counting the track pulse.

According to the arrangement thus made, when supplied with a command, which moves the head 3 to a desired track, from a host computer 40 through an interface circuit 41, the microcomputer 39 forms a control signal (velocity control signal) for moving the head 3 from the track in contact with the head 3 to a target track. A value of the control signal is generated in the form of a digital value. The digital control signal from the microcomputer 39 is supplied through a digital-to-analog (D/A) converting circuit 42 to a summing-amplifier 43.

The frequency-to-voltage converting circuit 35 derives a voltage value corresponding to frequencies of the signals A, B, C and D, i.e. the moving speed of the head 3. This signal is supplied to the summing amplifier 43. A signal from the summing-amplifier 43 is supplied to one contact of a switch circuit 44 and then through a summing-amplifier 66 to a drive amplifier 45 for the voice coil motor 6 (see FIG. 2), whereby the head 3 is moved to the track thus designated by the command signal from the host computer 40.

More specifically, the microcomputer 39 generates a velocity control signal which is, for example, shown by a curve a in FIG. 6A, and the velocity of the head 3 is changed in fact as shown by a curve b in FIG. 6A in response to the velocity control signal so that the head 3 is moved to the target track. FIG. 6B illustrates the waveform of the track pulses in the above-speed control period. In this manner, the so-called seeking operation is performed and according to the above-mentioned arrangement. Thereafter, the head position is servo-controlled.

To be more concrete, after the seeking operation, the switch circuit 44 is changed in position. The reproduced signal from the head 3 is supplied to a terminal 46, and the signal at the terminal 46 is supplied to a head amplifier 47. When a plurality of hard discs 1 are utilized in a stacked condition, a signal corresponding to a desired record surface and derived from the microcomputer 39 switches the head amplifier 47, thereby selecting the corresponding head 3. A signal from the head amplifier 47 is supplied through an automatic gain control (AGC) amplifier 48 to a servo signal reproducing circuit 49, and is also supplied to a servo signal detecting and sample and hold signal generating circuit 50.

In this hard disc drive apparatus, the pattern of a so-called tribit servo signal is formed on the hard disc 1, for example, at its every sector with a pattern as shown in FIG. 7A so that, when the head 3 is located at the position shown by X1 in FIG. 7A, then the reproduced output of the servo signal becomes as shown in FIG. 7B. Then, the sample and hold signal generating circuit 50 generates a detecting signal (see FIG. 7C) at every other predetermined time T1 from the position of, for example, the second negative-going pulse of this signal shown in FIG. 7B. This detecting signal is supplied to the servo signal reproducing circuit 49 in which the level of a positive-going pulse is detected to derive a difference therebetween. Thus, the servo signal reproducing circuit 49 derives a difference output shown in FIG. 7D in response to the position of the head 3, thereby detecting the displacement of the head 3 from the track. In this embodiment, this detecting signal is generated intermittently at every sector. This signal is supplied to a sample and hold circuit 51, and the sample and hold circuit 51 is also supplied with a sample and hold signal from the sample and hold signal generating circuit 50 at the position of, for example, the third negative-going pulse. Therefore, the sample and hold circuit 51 forms a successive position signal.

This position signal is supplied directly to one contact of a switch 53 and is also supplied through an inverter 52 to another contact of the switch 53. The switch 53 is changed in position in response to the signal from the microcomputer 39, thereby making the polarities of the position signal constant at every track. An output signal from the switch 53 is supplied to a summing-amplifier 54.

A signal corresponding to a desired level, for example the center level, is outputted from the microcomputer 39 and is supplied through the D/A converter 42 to the, summing-amplifier 54 which derives and outputs a track following servo control signal corresponding to the displacement of the head 3 from the track centerline.

This control signal is supplied to filter circuit 58a to separate contacts of a change-over switch circuit 59, and the change-over switch circuit 59 is changed in position in response to a switching control signal from the microcomputer 39. A signal from the change-over switch circuit 59 is supplied to another contact of the switch circuit 44. The filter circuit 58a is comprised of an integrating circuit 55a, a secondary filter 56a, which reduces the gain of the mechanical resonant frequency, and a phase-compensating circuit 57a.

The above-mentioned zone recording is performed. When the number of sectors is different in each zone, the sampling frequency (frequency) for sampling the servo signal is different in each zone in the servo sector provided between the data sectors. As a result, the frequency characteristics of the servo signal such as gain and phase become different in each zone. Therefore, in order to optimize the compensating characteristic at every zone, a second filter circuit 58b formed of an integrating circuit 55b, a secondary filter 56b and a phase-compensating circuit 57b, and a third filter circuit 58c formed of an integrating circuit 55c, a secondary filter 56c and a phase-compensating circuit 57c are provided in response to the zones, whereby the change-over switch circuit 59 selects one of the filter circuits 58a, 58b and 58c in response to the characteristic corresponding to the zone included in the target track. Thus, the head 3 performs the seeking operation toward the desired track designated by the host computer 40 and the succeeding head position servo.

A low-pass filter 67, an A/D converter 68, a D/A converter 69, the microcomputer 39 and an electrically-programmable ROM (EPROM) 71 constitute a compensating circuit which is employed to cancel an external force applied to the head arm 4 out. Prior to the explanation of this compensating circuit, let us explain the external force applied to the head arm 4.

As shown in FIG. 2, the circuit base plate 9 fixed to the chassis 15 and the head 3 and the drive coil 6b on the head arm 4 are connected to each other by the flexible cables 13 and 14, whereby the head arm 4 can be freely rotated by the bending of the flexible cables 13 and 14. In that event, if the bending ratio of the flexible cables 13 and 14 is changed when the voice coil motor 6 is driven, then a resilient repulsive force will be generated in the flexible cables 13 and 14 and this resilient repulsive force becomes a torque external disturbance, thereby exerting a harmful influence upon the voice coil motor 6. Accordingly, in the hard disc drive apparatus, if the compensating circuit is not provided in order to cancel the above-mentioned external disturbance out, then the positioning control feedback loop will perform the positioning control as well as the cancelling operation for cancelling the above-mentioned external disturbance. Thus, it takes a lot of time (seeking time) for the head to reach the desired position and to stabilize thereat. Also, the stability of the positioning control is degenerated.

The external disturbance is not limited to those caused by the flexible cables 13 and 14 and may include irregular rotation torque which is generated by an air flow caused by the rotation of the disc 1 and applied to the head arm 4. In this embodiment, let us consider the total sum of external forces of all causes. These external forces are not applied to the head arm 4 with a constant rotation torque at all times, and it is to be noted that these external forces may become the function of the position of the head arm 4. Further, the resilient repulsive force of the flexible cables 13, 14 and so on also includes an aging change characteristic when they are utilized for a long period of time.

Referring back to FIG. 5, let us consider that at the completion of the seeking operation, the switch 44 is changed in position and the head 3 proceeds to the track-following operation. The track following servo control signal from the change-over switch circuit 59 is supplied through the switch 44, the summing-amplifier 66 and the drive amplifier 45 to the voice coil motor 6. Simultaneously, the track following servo control signal from the change-over switch circuit 59 is supplied through the low-pass filter 67 to the D/A converter 68, in which it is converted to a digital signal. This digital signal is supplied through the microcomputer 39 to the RAM 71. At the same time, the present address of the head 3 is computed by the microcomputer 39 on the basis of the track pulse obtained from the track pulse forming circuit 38 and then supplied to the RAM 71. A signal from the RAM 71 is supplied through the microcomputer 39 to the D/A converter 69, and the analog signal thus converted is supplied to the summing-amplifier 66.

In this hard disc drive apparatus, prior to first using it, an external compensating value is stored in the RAM 71. More specifically, in the arrangement shown in FIG. 5, the output of the D/A converting circuit 69 is made "0" and the head 3 is positioned at a desired track position. Then, under this condition, after a sufficiently long period of time, the feedback loop is stabilized. Accordingly, the change-over switch circuit 59 derives a servo control signal which compensates for the torque external disturbance caused by the cables 13, 14 and so on. This servo control signal is supplied through the low-pass filter 67 to the A/D converter 68, in which it is converted to the digital signal. Then, the RAM 71 stores this digital servo control signal at an address thereof corresponding to the track position. The above-mentioned operation is performed for all track positions, if necessary, whereby external compensating values corresponding to the track positions are stored in the RAM 71.

Thus, when the voice coil motor 6 is driven upon use, the external force compensating value corresponding t the track position at which the head 3 is located is read out from the RAM 71, and the external force compensating value thus read is converted to an analog value by the D/A converter 69. This analog value is added to the servo control signal from the switch 44 by the summing-amplifier 66 whereby the control for the torque external disturbance is automatically performed, and only the positioning control is performed. Thus, the position control can be performed very well and stably.

According to the hard disc drive apparatus as described above, since the actuator is driven by use of an external force compensating value stored in response to the track position, a bad influence such as a torque external disturbance exerted upon the positioning control operation and so on can be removed, which provides a very excellent and stable control operation.

Since the control operation is stabilized, the high-speed positioning (seeking) operation becomes possible, which makes the apparatus of the invention suitable for a computer whose operation speed is increased.

In the above-mentioned apparatus, it is possible that the external force compensating values for all the track positions are not stored in the RAM 71 but those values for the intermittent track positions are stored in the RAM 71 and the external force compensating values therebetween can be interpolated. Conversely, if the external force compensating values for the intermittent track positions are stored in the RAM 71 in addition to all track positions, then it will become possible to perform the head position control operation more smoothly.

Further, the external force compensating value may not be stored in the RAM 71 each time in use but backup means may be provided and the preceding compensating value may be used. Only when the aging change occurs or external circumstances change, the compensating value may be stored in the RAM.

The hard disc drive apparatus can be suitably applied to the aging change and the change of outside circumstance.

Furthermore, the torque external disturbance is compensated for so there is more freedom for selecting materials of the flexible cables. In addition, the structures by which the head is rotated or moved straightforwardly can be selected with a large freedom.

Let us now explain a correcting circuit for correcting the 4-phase output signal from the photosensor 10.

Figure 8:
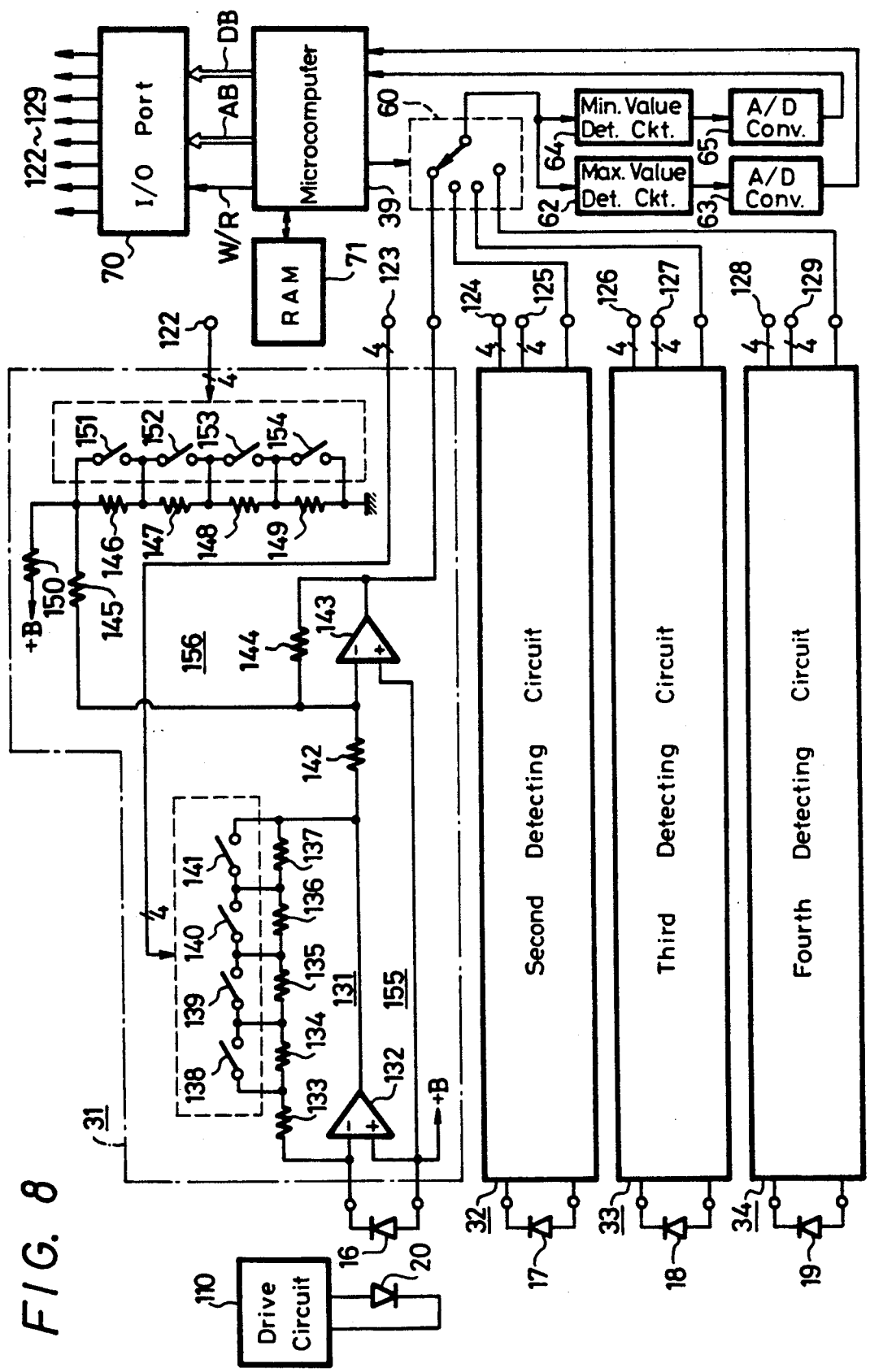
FIG. 8 is a block diagram showing a signal processing circuit which processes a signal from the photo-encoder used in the hard disc drive apparatus of the present invention.

Referring to FIG. 5, the signals from the first to fourth detecting circuits 31 to 34 are sequentially selected by a selector 60, and an output signal from the selector 60 is supplied through a maximum value detecting circuit 62 and an A/D converter 63 to the microcomputer 39. The output signal of the selector 60 is also supplied through a minimum value detecting circuit 64 and an A/D converter 65 to the microcomputer 39. A control signal from the microcomputer 39 is supplied to an I/0 port 70, from which control signals are supplied to the first to fourth detecting circuits 31 to 34, respectively. With reference to FIG. 8 a circuit which processes the signal will be explained. In FIG. 8, like parts corresponding to those of FIG. 5 are marked with the same references and therefore need not be described in detail.

In FIG. 8, it will be seen that the first to fourth detecting circuits 31 to 34 are supplied with detected outputs of photo-diodes 16 to 19, respectively. The light emitting diode 20 is driven by a drive circuit 110 in the light emission. The lens 23, the scale 8 and reticle 21 are provided between the light emitting diode 20 and the photo-diodes 16 to 19 as described before in respect to FIG. 3. The scale 8 is moved in accordance with the rotation of the head arm 4 shown in FIG. 2. These arrangement ar not shown in FIG. 8.

Let us first explain the arrangements of the first to fourth detecting circuits 31 to 34. These detecting circuits 31 to 34 are the same, and therefore, only the first detecting circuit 31 will be explained in detail. In FIG. 8, the first detecting circuit 31 is shown to include a current-to-voltage converting circuit 131 and a voltage offset amount adjusting circuit 156 connected to the output side of the circuit 131. The current-to-voltage converting circuit 131 serves as a gain adjusting circuit 155 which is supplied with the detected output from the photo-diode 16.

The current-to-voltage converting circuit 131 is comprised of an operational amplifier 132, resistors 133 to 137 for adjusting the gain of the operational amplifier 132 and on-off switches 138 to 141. The cathode of the photo-diode 16 is connected to the inverting input terminal of the operational amplifier 132, and an anode of the photo-diode 16 and a constant voltage supply source +B are connected to a non-inverting input terminal of the operational amplifier 132. The series circuit of resistors 133 to 137 is connected between the output terminal and the inverting input terminal of the operational amplifier 132, and the on-off switches 138 to 141 are connected between the respective ends of resistors 134 to 137 and the respective junctions therebetween.

In the voltage offset amount adjusting circuit 156, an input resistor 142 is connected between an inverting input terminal of an operational amplifier 143 and the output terminal of the operational amplifier 132, a non-inverting input terminal of the operational amplifier 143 is connected to the constant voltage supply source +B, a feedback resistor 144 is connected between the output terminal and the inverting input terminal of the operational amplifier 143, a series circuit of offset adjusting resistors 145 to 149 is connected between the inverting input terminal of the operational amplifier 143 and the ground, on-off switches 151 to 154 are respectively connected between one ends of the resistors 146 to 149 and the junctions of the resistors 146 to 149 and a resistor 150 is connected between the junction of the resistors 145 and 146 and the constant voltage supply source +B.

The operational amplifier 143 derives a detected output whose waveform (FIG. 4B) is triangular. Then, the detected outputs from the first to fourth detecting circuits 31 to 34 are supplied to the selector 60, in which they are selectively switched in response to a switching control signal from the microcomputer 39 and are fed to the maximum value detecting circuit 62 and the minimum value detecting circuit 64. Thus, the maximum value detecting circuit 62 and the minimum value detecting circuit 64 detect the maximum and minimum values, respectively. The detected outputs from the circuits 62 and 64 are respectively supplied to the A/D converters 63 and 65, in which they are converted to digital values. These digital detected values are supplied to the microcomputer 39. The A/D converting circuits 63 and 65 may be replaced with a common A/D converting circuit.

The microcomputer 39 supplies control signal input terminals 123, 125, 127, 129; and 122, 124, 126, 128 with control signals through the I/O port 70. Thus, one of or a plurality of on-off switches 138 to 141 of the gain adjusting circuit 155 are selectively turned ON so that the difference and sum operation of the maximum value and the minimum value of the detected outputs are performed for each of the detecting circuits 31 to 34 and one of a plurality of on-off switches 151 to 154 is selectively turned ON so that the sum values thereof are made constant. A write and read control signal line W/R, an address bus line AB and a data bus line DB are each provided between the microcomputer 39 and the I/O port 70. The nonvolatile memory, i.e. RAM 71 stores the control status of the gain adjusting circuits 155 and the offset amount adjusting circuits 156 of the respective detecting circuits 31 to 34, i.e. ON-OFF conditions of the on-off switches 138 to 141 of the gain adjusting circuits 155 and ON-OFF conditions of the on-off switches 151 to 154 of the voltage offset amount adjusting circuits 156. Upon operation, the contents stored in the RAM 71 are read out, and on the basis of the thus read contents, the microcomputer 39 controls the gain and the offset amounts of the respective detecting circuits 31 to 34.

According to the optical position detecting apparatus as described above, it becomes possible to positively and easily adjust the gains and the offset amounts of the plurality of detecting circuits which are supplied with the detected outputs from the plurality of photo-detectors. Also, the adjusted states can be reproduced with ease.

In the above-noted embodiment, the record surface of the disc is divided along the radius position of the track to provide the plurality of zones, and each of the zones has a different number of the data sectors therein in such a manner that the outer zone has more data sectors than the inner zone. Further, the servo sector is provided between the data sectors, and the servo signal such as the tribit signal or the like is recorded in the servo sector. Thus, the head is moved to the target track by the position encoder such as the photo-sensor for sensing the position of the head arm in the seeking operation, and then the servo signal is intermittently read out from the servo sector of the target track, thereby positioning the head accurately.

Figure 9:
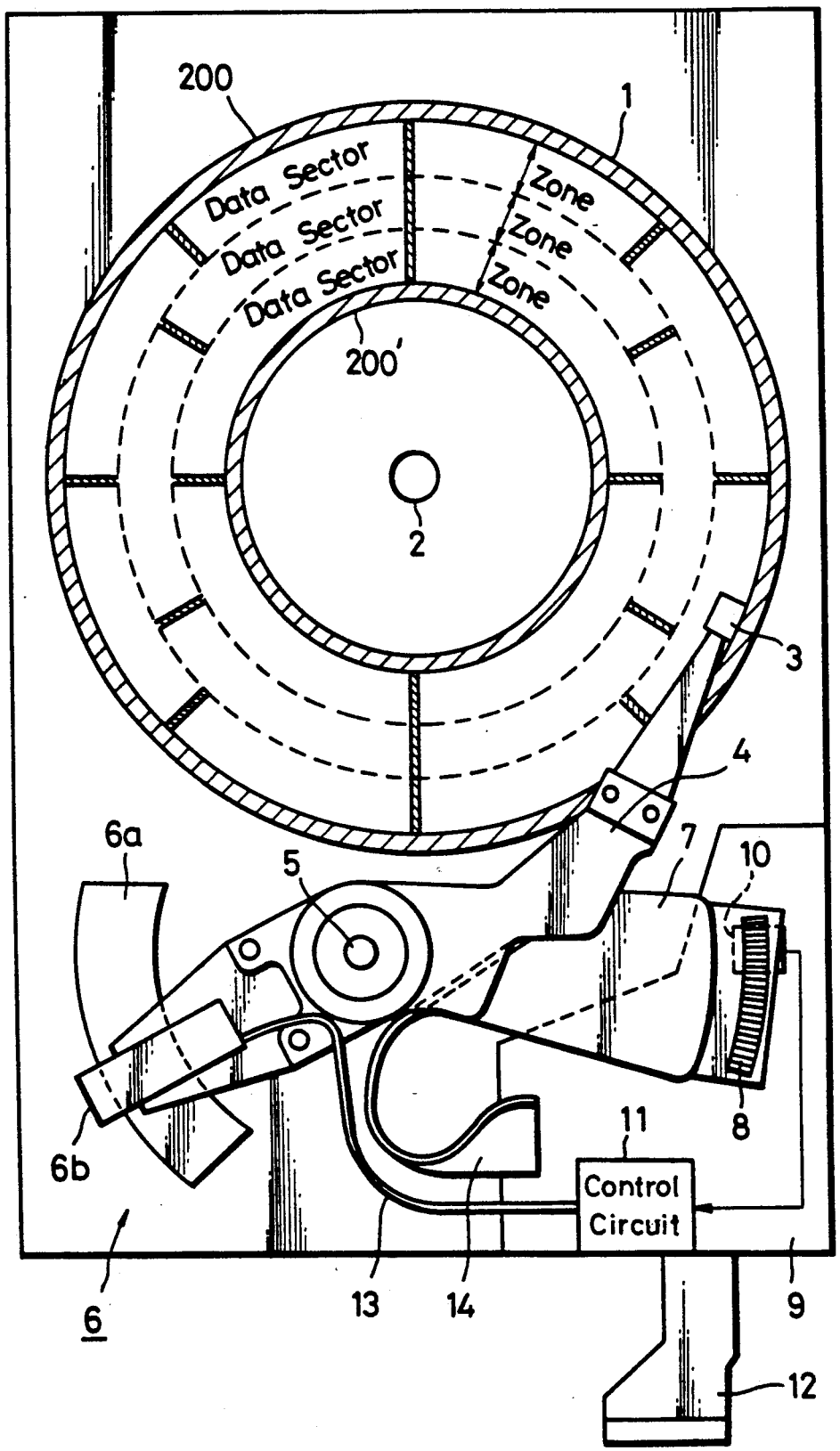
FIG. 9 is a planar view of the hard disc drive apparatus according to another embodiment of the present invention.

FIG. 9 illustrates another embodiment of the present invention. According to this embodiment of FIG. 9, the servo signal is not recorded in the servo sector but it is recorded on the whole areas of the innermost and outermost portions of the record surface of the disc. In FIG. 9, like parts corresponding to those of FIG. 2 are marked with the same references and therefore need not be described in detail.

Figure 10:
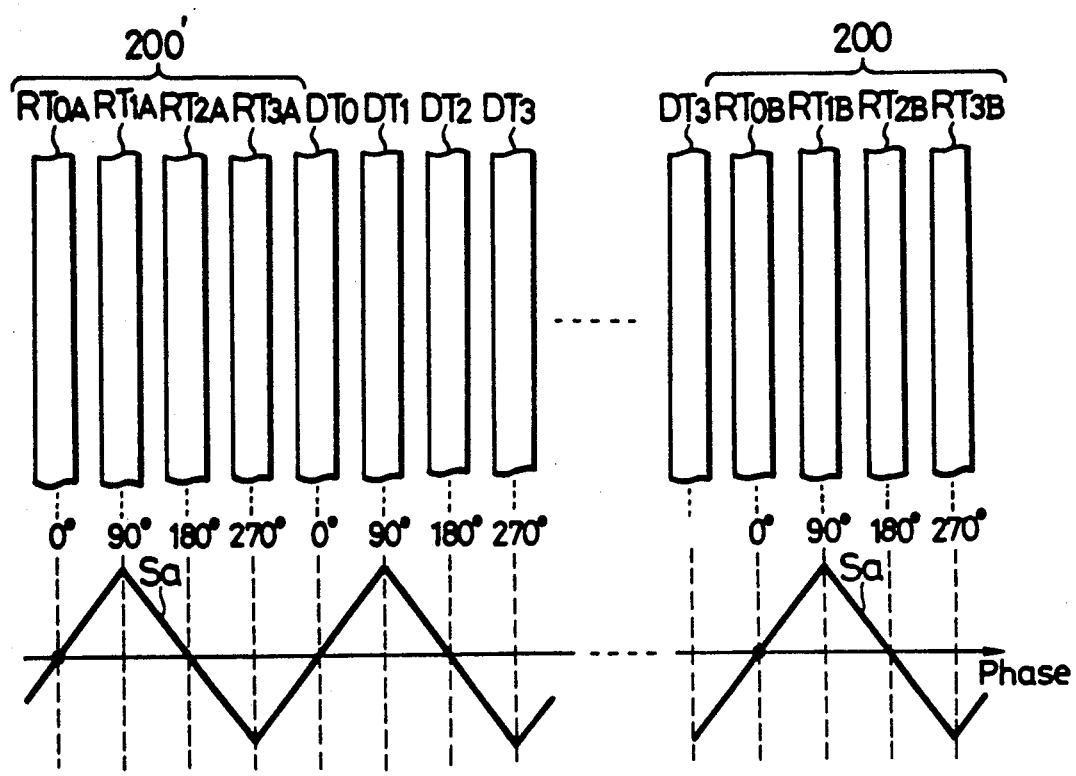
FIG. 10 is a schematic representation used to explain a relationship between an output of the photo-encoder and data track and reference track.

As shown in FIG. 9, a reference zone 200 is formed on the outermost peripheral portion of the record surface of the disc 1. In the reference zone 200, four reference tracks $RT_{0B}$, $RT_{1B}$, $RT_{2B}$ and $RT_{3B}$ are recorded in response to four-phase outputs from the photo-sensor 10 as shown in FIG. 10. FIG. 10 illustrates only one phase-output of the four-phase outputs of the photo-sensor 10. Similarly, four reference tracks $RT_{0A}$, $RT_{1A}$, $RT_{2A}$ and $RT_{3A}$ are formed on a reference zone 200' of the innermost peripheral portion of the record surface of the disc 1. The tribit signal shown in FIG. 7 is recorded on each reference track.

In this embodiment, when the power switch of the disc drive apparatus is turned ON, the head 3 is positioned over each reference track in response to the output of the photo-sensor 10 in the seeking operation, and the off track amount is supplied through the low-pass filter 67 and the A/D converter 68 to the microcomputer 39 (see FIG. 5). Then, 8 off-track amounts corresponding to the 8 reference tracks are stored in the RAM 71. When the head 3 is positioned over the data track in the seeking operation at the completion of this calibration operation, the following tracking-servo is performed.

Figure 11:
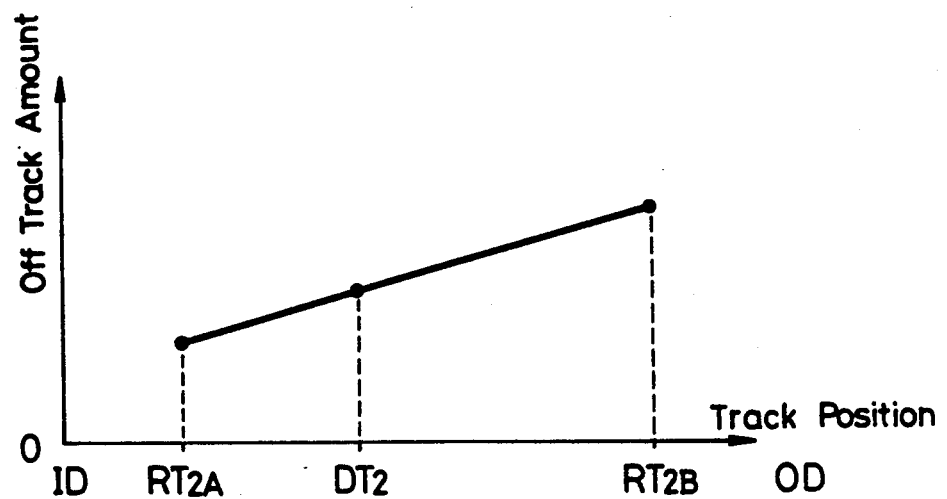
FIG. 11 is a schematic representation to which reference will be made in explaining the tracking servo operation of another embodiment shown in FIG. 9.

In accordance with the output from the photo-sensor 10, the head 3 is positioned over a target data track in the seeking operation. In this case, however, the servo signal can not be obtained from the data track unlike the first embodiment of FIG. 2. Therefore, the off-track amount stored in the RAM 71 is read out, and the microcomputer 39 computes the off-track amount corresponding to the data track. The calculated off-track amount is supplied through the D/A converter 69 to the voice coil driving amplifier 45. In that event, dependent on which one of four-phase outputs from the photo-sensor corresponds to the target track, two suitable off-track amounts are selected from 8 off-track amounts stored in the RAM 71. For example, when the head 3 is positioned over the data track $DT_2$ ($DT_2$ indicates a number of track groups existing at every 4 tracks) in the seeking operation, the off-track amounts corresponding to the reference tracks $RT_{2A}$ and $RT_{2B}$ are read out from the RAM 71. Then, the microcomputer 39 computes the off-track amount in the target track $DT_2$ from an interpolation straight line shown in FIG. 11. Four straight lines for linear interpolation shown in FIG. 11 are available, and one of the four interpolation straight lines is selected depending on the selection of the target data tracks $DT_0$, $DT_1$, $DT_2$ and $DT_3$ In this manner, the servo-tracking operation is performed. The above-mentioned calibration is performed at every predetermined time (for example, at every five minutes), and the off-rack amount to be stored in the RAM 71 is updated each time the calibration is performed.

According to the present invention, as described above, the recording capacity can be increased efficiently by the zone-recording system, and the head can be positioned accurately over the target track by use of the external position encoder.

Having described preferred embodiments of the invention with reference to the accompanying drawings in detail, it is to be understood that the present invention is not limited to those precise embodiments and that many changes and modifications could be effected by one skilled in the art without departing from the spirit and scope of the novel concepts of the invention as defined in the appended claims.

We claim as our invention:

1. A magnetic disc apparatus comprising:
   (a) at least one magnetic disc having a plurality of track groups thereon at different distances from the center of the disc, each of which track groups comprises plural data tracks having plural data sectors, each of the track groups having a different number of the data sectors therein in such a manner that the radially outermost track group has more data sectors than the radially innermost track group;
   (b) transducer means for reading and writing data signals from and on the data tracks;
   (c) actuator means for positioning the transducer means over a desired one of the data tracks;
   (d) position sensor means for sensing the position of the transducer means relative to the magnetic disc, and for generating at least two periodic signals each of which is out of phase with each other; and
   (e) controller means for controlling the actuator means according to the periodic position signals so that the transducer means can be positioned over a selected one of the data tracks.

2. A magnetic disc apparatus according to claim 1, wherein servo signals are prerecorded in servo sectors located between the data sectors and the transducer means reads the servo signals, the controller means controlling the actuator means according to the periodic position signals and the servo signals so that the transducer means can be initially positioned over the desire done of the data tracks and can follow the desired track.

3. A magnetic disc apparatus according to claim 2, further comprising selector means for selectively supplying one of the periodic position signals and the servo signals to the controller means in such a manner that the periodic position signals are selected in a track seeking operation and that the servo signals are selected in a track following operation.

4. A magnetic disc apparatus according to claim 1, wherein the servo signals are prerecorded at plural positions in servo tracks which are circumferentially provided on the magnetic disc and the transducer means reads the servo signals, the controller means controlling the actuator means according to the periodic position signals and servo signals so that the transducer means can be initially positioned over the desired one of the data tracks and can follow the desired track.

5. A magnetic disc apparatus according to claim 4, further comprising selector means for selectively supplying one of the periodic position signals and the servo-signals to the controller means in such a manner that the periodic position signals are selected in a track seeking operation and that the servo signals are selected in a track following operation.

6. A magnetic disc apparatus according to claim 4, wherein a plurality of the two servo tracks are provided both in the radially innermost and radially outermost regions on the magnetic disc.

7. A magnetic disc apparatus according to claim 1, wherein
   (a) the position sensor means includes a plurality of gain adjusting circuits and a plurality of voltage offset amount adjusting circuits for separately modifying the gain and voltage offsets of the periodic signals; and
   (b) the controller means includes means for selectively adjusting the gains of the gain adjusting circuits and the voltage offset amounts of the voltage offset amount adjusting circuits.

8. A magnetic disc apparatus according to claim 7, wherein the controller means further includes memory means for storing and retrieving data representative of previously selected gains and voltage offset amounts.

9. A magnetic disc apparatus comprising:
   (1) at least one magnetic disc having a plurality of track groups thereon at different distances form the center of the disc each of which groups comprises plural data tracks having plural data sectors, each of the track groups having a different number of the data sectors therein in such a manner that the radially outermost track group has more data sectors, and wherein servo signals are provided in servo sectors located between the data sectors;
   (2) transducer means for reading and writing data signals from and on the data sectors, and for reading the servo signals from the servo sectors;
   (3) servo signal processing means for processing the servo signals read from the servo sectors into a tracking error signal, wherein the servo signal processing means has a plurality of filter means for separating filtering the tracking error signal, and including a means for selecting one of the plural filter means corresponding to the track group from which the servo signal is read and supplying the selected one filter means with the tracking error signal; and
   (4) controller means for controlling the actuator means according to the tracking error signal from the selected one filter means so that the transducer means is positioned over the desired one of the data tracks.

* * * * *